UNITED STATES PATENT OFFICE.

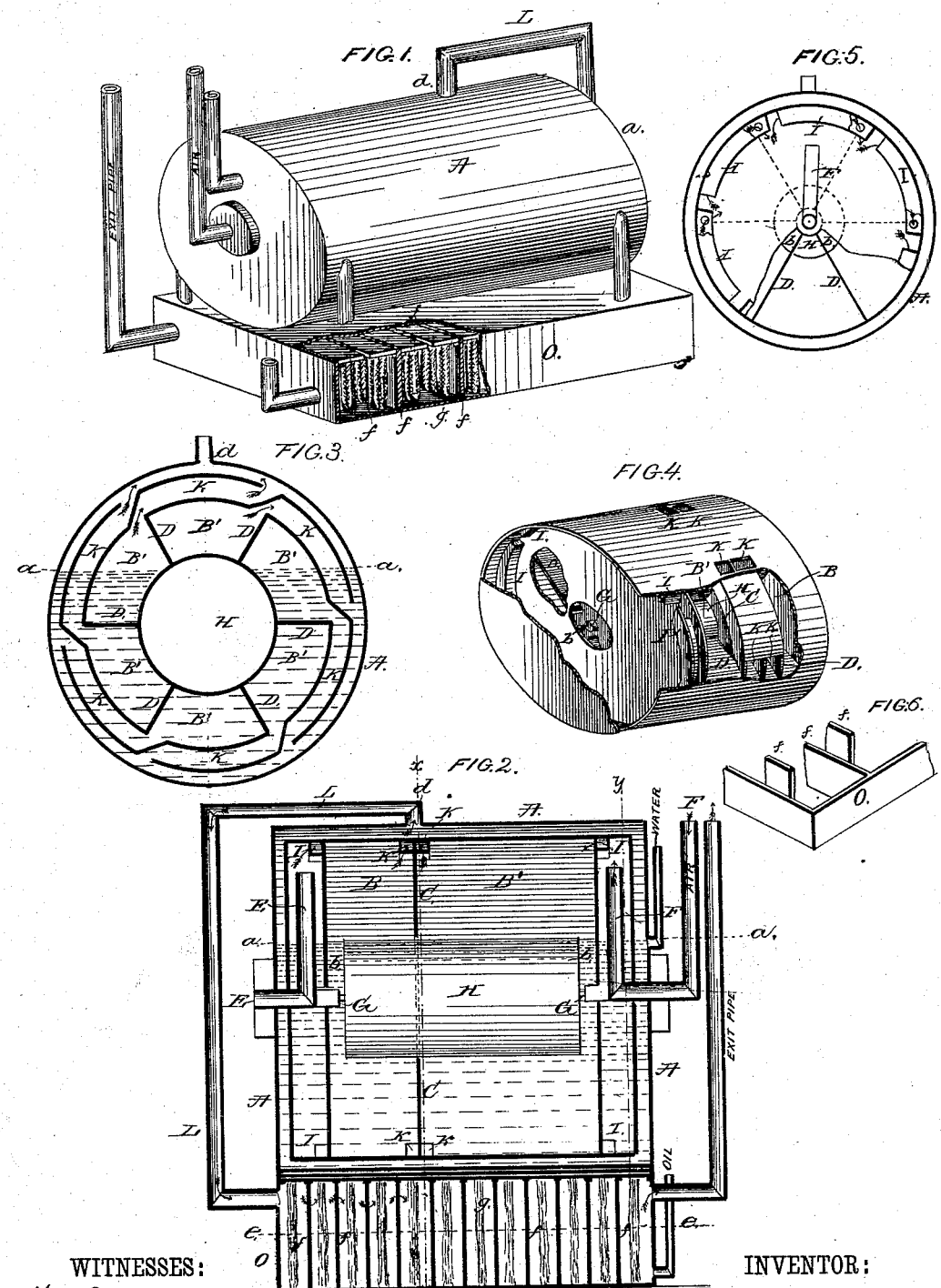
T. H. HICKS.
Carbureter.
No. 218,967. Patented Aug. 26, 1879.

THOMAS H. HICKS, OF LONDON, ONTARIO, CANADA, ASSIGNOR OF ONE-SIXTH HIS RIGHT TO ALEXANDER McBRIDE, OF SAME PLACE.

IMPROVEMENT IN CARBURETERS.

Specification forming part of Letters Patent No. 218,967, dated August 26, 1879; application filed November 23, 1878.

*To all whom it may concern:*

Be it known that I, THOMAS HAMMILL HICKS, of London, Middlesex county, Canada, have invented a new and useful Improvement in Carbureters; and I do hereby declare that the following is a full, clear, and exact description of the same.

My invention is an improvement in the class of cylindrical drums or blowers for use with carbureters proper, and which are provided with gudgeons, and rotate in water or other liquid, so that the latter alternately seals and opens the induction and exit orifices for the air or gas passed through the blower or drum.

Like many others of its class, the machine is designed to be placed between an ordinary gas-meter and the burners to which the gas is conducted, the gas-pipe being divided at a point contiguous to the meter, and suitably attached to opposite sides or ends of the carbureter, so that the gas will pass through the latter on its way to the burners, and thus become enriched by the addition of a portion of the surplus carbon of the carbureting-liquid. The force of the current of gas flowing to the burners is the motive power which turns the blower or drum on its axis, and I utilize such force for inducting atmospheric air into a portion of the rotating drum which exactly corresponds in construction to that part of the drum through which the gas passes.

It is obvious that the friction of the drum incident to its rotation should be reduced to a minimum, which is the principal object of my invention. I accomplish it by providing the drum or carbureting-vessel proper with a permanently-attached and concentrically-arranged buoying-cylinder, which floats in the same liquid wherein the drum is partly submerged, and thus mainly relieves the gudgeons or journals of the drum of the weight of the latter.

Another feature of my invention is the arrangement of the induction and eduction passages and six gas or air chambers of the drum, whereby either the gas or air or the product formed by their combination is forced into the conducting-pipe in uniform quantity in a given time, or with a pressure as nearly uniform as possible, so that "blowing" will be avoided and the flame of the light will not flicker.

In the accompanying drawings, forming part of this specification, Figure 1 is a perspective view, part being broken away, of the carbureter complete. Fig. 2 is a vertical longitudinal section of the same. Fig. 3 is a vertical cross-section of the rotating drum and its concentric buoying-cylinder, taken on the broken line *x x*, indicated in Fig. 2. Fig. 4 is a perspective view of the drum, which is represented broken away at several points. Fig. 5 is a vertical cross-section on line *y y* of Fig. 2. Fig. 6 is a detail perspective of a portion of the carbureter proper.

The sheet-metal cylindrical drum proper is inclosed in a casing, A, and has two sets or series of chambers, B B', which are separated by the radial partition C. The chambers are six in number for each set or series, and of segmental shape, being formed by radial partitions D.

The chambers B on the left, Fig. 2, receive the coal-gas as it comes from the meter, (not shown,) through tube E, and the larger chambers B' receive the atmospheric air through tube F.

Both tubes E F are right-angular in form, and their vertical portions extend up in the spaces at the heads of the drum, while their horizontal portions extend through the casing A, and also serve as the bearings of the axis or gudgeons G of the drum.

H is the hollow air-tight sheet-metal cylinder, which buoys the drum in the liquid that fills the casing A to the line *a*. Said cylinder is arranged concentrically within the drum, but is of less length. The partition C surrounds the cylinder, or is radial to it, in a plane at right angles to its axis, while the partitions D are in radial planes, which are parallel to its axis. The spaces *b* at the end of the cylinder are divided radially by the extension of partitions D inward to the axis G, and these spaces *b* serve as passages which communicate with the openings around the axis of the drum, and allow free access of the liquid in which the drum floats.

Each gas and air chamber B and B' is provided with an induction tube or passage, I, and eduction tube or passage K. These tubes or passages are peculiarly arranged. The induction-tubes I are on the outer sides of the ends of the drum, contiguous to its periphery, and extend forward or to the left, Fig. 4, from the left-hand corners of the respective chambers. The eduction-tubes K are likewise contiguous to the periphery of the drum, but on opposite sides of the partition C, and extended forward from the right-hand corners, Figs. 3 and 4, of the respective chambers. Thus said tubes K open on the outer side or periphery of the drum.

The operation of the drum is as follows: The casing A being filled with water or oil to the height of the line $a$, or somewhat above its middle, the gas received from the meter through pipe E enters the mouth of that one of tubes I which is exposed above the liquid in the casing A, and having filled that one of chambers B with which such tube communicates, the force or pressure of the gas acting against the surface of the liquid, (which enters the chamber through spaces $b$,) and reacting upon the left-hand partition D of the chamber, causes the latter to rise, and thus imparts rotation to the drum as a whole. The mouth of the tube I, by which the gas has entered the chamber, directly enters the liquid, and is thus sealed; but the liquid will rise in the tube and fill the chamber as the drum continues to rotate, and thus force the gas out of the chamber through its tube K. Thus the gas or air enters the chambers on one side, and leaves them on the other. While this operation goes on with respect to the gas, the air is being taken into and expelled from the other side of the drum in like manner, by means of chambers B' and their connecting-tubes I K; but since the air is not under pressure it has no influence on the drum, except to slightly retard its rotation. The gas and air carried through the drum mingle at $d$ in the upper portion of the casing A, and are thence conducted through pipe L to the carbureter proper O, which is filled to point $e$ with gasoline or other suitable liquid hydrocarbon, and provided with vertical transverse partitions $f$ and suspended fibrous packing $g$ for taking up the liquid by capillary attraction. During this rotation of the drum, the cylinder H, floating on the water or other liquid, buoys or carries the weight of the drum, and thus relieves the journals G of friction as far as practicable. The friction of the drum and cylinder H with the water is therefore the only force opposing their rotation.

The drum having six chambers instead of four, as in some blowers or drums of this class, it results from this and the arrangement of the induction and eduction tubes that each chamber as it is filled is carried at least four inches out of the liquid before beginning to discharge, so that the water may have a varying height in the casing—say, from a little above the vertical center of the drums to a point near the circumference—without causing compression or unequal pressure of the gas in the chambers, a want of uniformity of feed or supply to the burners, and a consequent "jumping" or flickering of the flame, which is so serious an annoyance.

In a drum with four chambers, one of them would begin to discharge as soon as filled; but in a drum with six chambers, each chamber is carried an eighth of a revolution after being filled before beginning to empty itself.

I am aware rotating drums or blowers have been provided with chambers from which eduction-tubes extend parallel to the periphery.

What I claim is—

1. In a carbureting apparatus, the combination, with the rotating drum having induction and eduction passages, and a casing partly filled with water or other liquid, of the air-tight buoying cylinder, which is arranged concentrically with said drum and forms an integral portion thereof, substantially as shown and described.

2. The combination, with the casing, partly filled with water or other liquid, and the rotating drum having the radial partitions and openings around the axis, of the buoying-cylinder, which is made of less length than the drum, thus leaving spaces at each end for free ingress and egress of water to and from the gas and air chambers, as shown and described.

3. In a blower for carbureters, the combination, with the drum or blower having radial partitions, forming a series of chambers, of the water-passages located around the axis, and communicating with the chambers at the outer ends thereof, and the induction-tubes at the end, and the eduction tubes or passages at or near the middle, of said drum or blower, the two sets of induction and eduction tubes extending in opposite directions parallel to the periphery, all as shown and described.

London, November 20, 1878.

THOMAS HAMMILL HICKS.

In presence of—
F. H. PURDOM,
I. E. PARKE.